United States Patent
Berg

(10) Patent No.: US 11,909,601 B1
(45) Date of Patent: Feb. 20, 2024

(54) IMPLEMENTING A SCALABLE 3D SIMULATION USING A DISTRIBUTED 3D KEYSPACE

(71) Applicant: Amazon Technologies, Inc., Seattle, WA (US)

(72) Inventor: Karl Berg, New Westminster (CA)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 17/351,094

(22) Filed: Jun. 17, 2021

(51) Int. Cl.
*H04L 41/14* (2022.01)
*H04L 67/1001* (2022.01)
*H04L 67/10* (2022.01)

(52) U.S. Cl.
CPC ........ *H04L 41/145* (2013.01); *H04L 67/1001* (2022.05); *H04L 67/10* (2013.01)

(58) Field of Classification Search
CPC ... H04L 41/145; H04L 67/1001; H04L 67/10; H04N 21/43072; H04N 21/816; H04N 21/4622; H04N 21/84; H04N 21/4312; G06F 3/011; G06F 3/012; G02B 27/0101; G02B 2027/014; G02B 2027/0141; G06T 19/006; G06T 2219/028; G06T 2219/024
See application file for complete search history.

(56) References Cited

U.S. PATENT DOCUMENTS

| | | | |
|---|---|---|---|
| 6,208,357 B1 | 3/2001 | Koga | |
| 8,678,929 B1 | 3/2014 | Nishimura | |
| 9,266,025 B2 | 2/2016 | Hall | |
| 10,159,901 B2 | 12/2018 | Justice et al. | |
| 10,553,034 B2* | 2/2020 | Chapman | ......... H04N 21/43072 |
| 10,967,259 B1 | 4/2021 | Berg | |
| 2004/0143852 A1 | 7/2004 | Meyers | |
| 2008/0026838 A1 | 1/2008 | Dunstan et al. | |
| 2009/0318223 A1 | 12/2009 | Langridge et al. | |
| 2014/0249749 A1 | 9/2014 | Hall | |
| 2018/0068040 A1* | 3/2018 | Lewis | ................... G06F 9/5061 |
| 2020/0218838 A1* | 7/2020 | Boulkenafed | ........... G06F 30/20 |
| 2020/0252298 A1* | 8/2020 | Hill | ........................ G06F 9/5066 |
| 2022/0203238 A1 | 6/2022 | Cournoyer | |

OTHER PUBLICATIONS

U.S. Appl. No. 17/325,145, filed May 19, 2021, Karl Berg et al.
U.S. Appl. No. 17/325,146, filed May 19, 2021, Karl Berg et al.

* cited by examiner

*Primary Examiner* — Tonia L Dollinger
*Assistant Examiner* — Mehulkumar J Shah
(74) *Attorney, Agent, or Firm* — Robert C. Kowert; Kowert, Hood, Munyon, Rankin & Goetzel, P.C.

(57) ABSTRACT

A simulation environment (e.g., multi-player game) may be hosted by multiple nodes of a provider network. The number of nodes may increase or decrease, depending on the load on the simulation. Each node may be assigned a root key that includes 3D coordinates. The nodes may maintain a circular keyspace that includes the x-axis coordinates, the y-axis coordinates, and the z-axis coordinates, according to a consistent hashing algorithm. A given node may have any number of successor or predecessor nodes along each axis keyspace. If load on a particular node increases above a threshold amount, a new node may be allocated and insert itself into the 3D keyspace, taking over authority for any entities that are located within a portion of the volume that was previously managed by the particular node.

20 Claims, 11 Drawing Sheets

IMPLEMENTING A SCALABLE 3D SIMULATION USING A DISTRIBUTED 3D KEYSPACE

BACKGROUND

Computer simulations are used to simulate different types of objects and environments. For example, a provider network may host a multi-player game that simulates a world in which each player can control an entity (e.g., a simulation of a person) to perform a variety of actions. For example, a player may provide inputs to a client device (e.g., keyboard inputs on a PC) that cause the entity to run in a particular direction or to throw a ball at another entity of the simulation.

Even though a provider network may have a powerful server, it may not be sufficient to handle a large load due to simulating a large number of entities. For example, if too many players join in a multi-player game, then performance of the simulation may be degraded and the server may crash due to overloading. To avoid this problem, multiple servers may be used to host a game. If a large number of clients will join in a given game, then a large number of servers may be used to handle the large load. If a large number of servers are used, then the chance of one or more server failures during a given game session rises, especially as servers become overloaded. When a server becomes overloaded or fails during a game session, it may crash the game session (or kick off gaming participants), degrading the customer experience for a potentially large number of game participants.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement a scalable 3D simulation using a distributed 3D keyspace, according to some embodiments. In embodiments, implementing a scalable 3D simulation using a distributed 3D keyspace may prevent a simulation from crashing, increase fault tolerance, and improve the ability of the simulation to scale as loads increase or decrease, compared to other techniques. As a result, the simulation may be provided and displayed on a client device with fewer errors and with much less lag or no lag (e.g., jerkiness in a displayed game), compared to traditional methods.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 10 and described below.

This specification begins with a description of a system for implementing a scalable 3D simulation using a distributed 3D keyspace. A number of different methods and techniques to implement a scalable 3D simulation using a distributed 3D keyspace, some of which are illustrated in accompanying flowcharts. Finally, a description of an example computing system upon which the various components, modules, systems, and/or techniques described herein may be implemented is provided. Various examples are provided throughout the specification.

Figure 1:
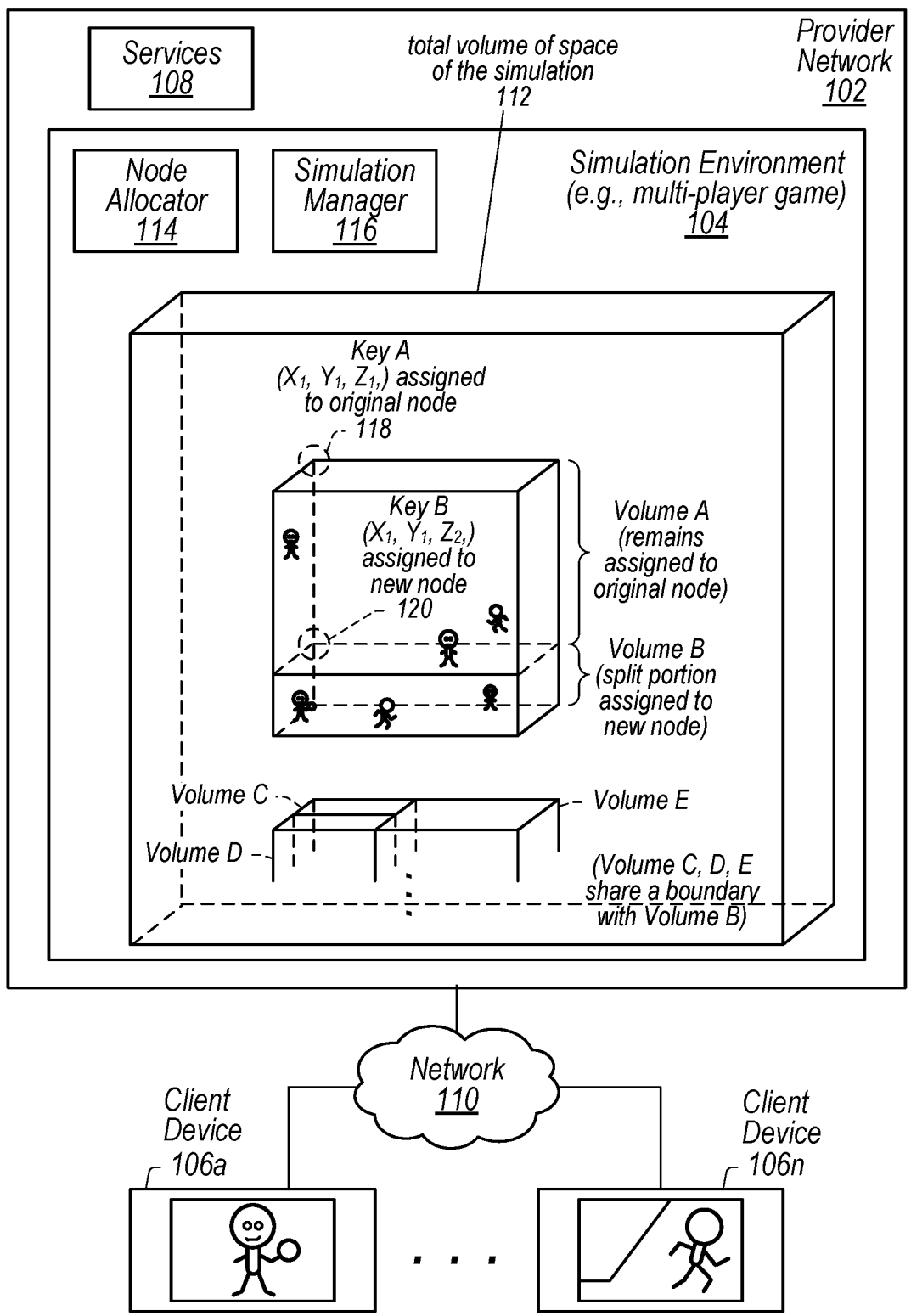
FIG. 1 is a logical block diagram illustrating a system for implementing a scalable 3D simulation using a distributed 3D keyspace, according to some embodiments.

FIG. 1 is a logical block diagram illustrating a system for implementing a scalable 3D simulation using a distributed 3D keyspace, according to some embodiments.

As shown, a service provider network 102 includes a simulation environment 104 that may implement a simulation of an environment/world (e.g., a world for a multi-player game) that may be displayed on any number of remote client devices 106 for viewing by users (e.g., players of a multi-player game). The provider network may include any number of services 108 that may be used by the simulation environment and/or clients (e.g., compute services, storage services). For example, the simulation environment may use any number of servers and/or compute instances of a compute service to execute some or all of a simulation. As another example, the simulation environment may use storage devices of a storage service to store data used for the simulation, such as state data for different entities. In embodiments, some or all of the compute functionality (e.g., physical and/or virtual servers/compute instances) or storage functionality (e.g., storage devices/databases) may be implemented by the simulation environment itself. In embodiments, the simulation environment 104 may be considered one of the services offered by the provider network.

The client devices may access the provider network 102, including the simulation environment and other services 108, by communicating with the provider network 102 via a wide area network 110 (e.g., the internet). Any number of the client devices may be stand-alone devices (e.g., a smart phone or other mobile device) or a PC that is part of a local client network (e.g., a private network at a user's home).

In the depicted embodiment, the simulation environment 104 implements a simulation of a total physical volume 112 of space (e.g., a 3D world in which different entities may interact). Although the example depicts a rectangular or cube shape for the total physical volume, in various embodiments the volume 112 may be any shape, may not have a fixed shape or boundary, and/or may change in shape or size. In some embodiments, a 2D world may be simulated, in which two of the dimensions would apply.

As shown, the simulation environment also includes a node allocator 114 and a simulation manager 116. In embodiments, the node allocator 114 may allocate new nodes (e.g., instantiate and/or configure new nodes) that can take on some of the load that is being handled by any number of a group of nodes to implement the simulation. In various embodiments, a "node" may be a compute instance, virtual server, and/or any other type of provider network resource that can manage at least a portion of the simulation, including state of any number of entities. In embodiments, a node is capable of performing some or all of the functions of a physical server of any particular type, brand, and/or configuration. In embodiments, a node that owns a volume, manages a volume, or is assigned a volume may indicate the same or similar meaning (e.g., the node has authority of state of any entities within the volume of the simulation). In embodiments, the simulation manager 116 may manage any number of resources to implement the simulation and/or the simulation environment for clients. For example, the simulation manager 116 may initialize a simulation for one or more clients in response to a request from a client or user/administrator. This may include performing any configuration needed in order to begin execution of the simulation (e.g., allocating/instantiating one or more nodes).

In the example embodiment, different nodes own different volumes of space of the simulation. A node that owns a volume may manage state of any number of entities within the volume. As depicted, an original node is assigned a root key A 118 (e.g., a root 3D coordinate) that indicates a volume that is owned by the original node, and the original node begins managing entities within that volume (e.g., the original volume that included both volume A and B). At a subsequent time, the original node determines, based on one or more criteria, that a portion of the volume of space (volume B) is to be assigned to a new node, wherein authority of entities located within the portion of the volume of space is to be transferred from the original node to the new node (e.g., the portion of the volume of space (volume B) is to be split from the original volume and assigned to the new node).

One or more criteria may be used by the original node to determine the portion of the original volume to be assigned to the new node. For example, the original node may determine that a processing load on the original node for managing the entities located within the original volume (e.g., managing state for the six depicted entities) exceeds a threshold amount or is predicted to exceed the threshold amount. The original node then determines that a transfer of the authority of the entities located within the bottom portion of the volume (volume B, which is about 25% of the original volume) from the original node to a new node will result in an approximately balanced distribution of the load between the original node and the new node (e.g., half of the entities will be in volume A and half in volume B).

In some embodiments, the original node may determine to split the original volume in half along an axis that results in the most balanced load distribution between the two resulting volumes. For example, the original node may determine that splitting the original volume in half along the z axis (e.g., into to a top and bottom half as depicted) will result in the most balanced load distribution between the two resulting volumes. This may result in a different number of entities in each volume (e.g., one entity in volume A and five entities in volume B).

The original node may then send a request to the node allocator for the new node, wherein the request indicates a new key (root key B) that uniquely identifies the portion of the volume of space with respect to other volumes of space of the simulation. The node allocator receives the request and allocates the new node. In embodiments, the new node is assigned a new key (root key B 120) that uniquely identifies the portion of the volume of space (volume B). As shown, the volume is split to create volume A owned by the original node and volume B to be owned by the new node.

In embodiments, the root key for a given node indicates a particular corner or other location of the volume of space owned by the given node, and the new node/simulation determines the volume of space owned by the given node based on the 3D coordinate/root key (e.g., using an algorithm). For example, the depicted embodiment may assign a top-back-left 3D coordinate of volume B as root key B 120 for volume B, and the new node/simulation environment assigns volume B to the new node based on the top-back-left 3D coordinate. In various embodiments, any other 3D coordinate of the volume of space to be assigned may be used.

The new node may receive, from the original node, authoritative state of the entities located within the portion of the volume of space (e.g., volume B) that has been split from the original volume owned by node A. The new node may then assume authority of the entities located within the portion of the volume of space (volume B). The original node retains authority of other entities within a remaining portion of the volume of the space (e.g., volume A). In embodiments, the original node may be the "predecessor node" of the new node and the new node may be the "successor node" of the original node (e.g., within a keyspace assigned to nodes, as described herein).

In the depicted embodiment, volume A shares a boundary with volume B (e.g., the plane at which the original volume was split into two volumes). Each side of a given volume may be adjacent to (e.g., share a boundary with) any number of other volumes that are each owned by a different node. For example, the top faces of volumes C, D, and E may each share a boundary with the bottom face of volume B. In embodiments, the three nodes that own volumes C, D, and E may each be successor nodes of the new node along a z-axis keyspace and the new node may be the predecessor node of those three nodes (e.g., using a keyspace ordered from the top to the bottom along the z-axis in the depicted example).

In embodiments, a different keyspace may be maintained for each axis according to a distributed hash table (DHT) algorithm (e.g., a chord DHT or other consistent hashing algorithm). For example, a fleet/group of nodes that implement the simulation may maintain a circular x-axis keyspace that includes the x-axis coordinates of the keys of each node (e.g., according to a consistent hashing algorithm), a circular y-axis keyspace that includes the y-axis coordinates of the keys of each node (e.g., according to a consistent hashing algorithm), and a circular z-axis keyspace that includes the z-axis coordinates of the keys of each node (e.g., according to a consistent hashing algorithm). Use of a consistent hashing algorithm has various advantages over other traditional techniques. For example, when a node drops out (e.g., due to failure or reduced load), there is no need to re-hash the entire keyspace(s). The only entities that are affected are those that were managed by the node that drops out (since each group of one or more entities are mapped to a particular node according to the consistent hash/consistent hashing algorithm).

Implementing a circular keyspace may provide various advantages over traditional techniques. For example, a search algorithm that traverses successor nodes and/or predecessor nodes does not require any special handling or different logic for a volume that is located at an edge or boundary of the world space of the simulation compared to any other volume. No extra or different logic is required for an algorithm to determine if a node that manages a volume at the edge of the world space has a successor and/or predecessor node along the keyspace.

In embodiments, each node may maintain a routing table for each axis across the world key-space (e.g., similar to the chord DHT in one dimension). This may allow queries/searches against a specific key space against any one node to route to the correct node in logarithmic time. This may allow a new node to quickly locate its correct insertion point along each axis. In embodiments, the concept from chord for one dimension may be used in three dimensions by maintaining separate routing tables for each axis. For a given axis, the other two coordinates of the key space may be fixed, and then the algorithm may locate ½ N, ¼ N, ⅛ N, etc. to build out the same/similar "finger" routing table structure that chord uses to route messages along one dimension. Finger routing tables for each axis may be kept up to date by calling functions that stabilize/update the tables.

In an embodiment, the new node may determine, based on communication with one or more of the existing nodes (e.g., walking/connecting to one or more nodes using a DHT search algorithm), an insertion point for an x-axis coordinate of the new key into the x-axis keyspace, an insertion point for a y-axis coordinate of the new key into the y-axis keyspace, and an insertion point for a z-axis coordinate of the new key into the z-axis keyspace. The new node may update the keyspaces by causing insertion of the x-axis coordinate, the y-axis coordinate, and the z-axis coordinate of the new key into the respective insertion points for the x-axis keyspace, the y-axis keyspace, and the z-axis keyspace. In embodiments, the new node itself may perform the insertion or another component of the simulation environment may perform the insertion (e.g., node allocator, manager).

In embodiments, the new node may then identify each of the neighbor nodes of the new node (e.g., nodes that own volumes that share a boundary with the volume owned by the new node) based on the updated x-axis keyspace, the updated y-axis keyspace, and the updated z-axis keyspace.

The new node may then connect with each of the neighbor nodes to perform various tasks. For example, the new node may obtain authoritative state data for entities within its volume and assume authority of those entities. The new node may also obtain proxy state data and/or authoritative state data for any number entities of other entities located within any number of the neighbor nodes (e.g., to serve as a backup node in case of failure, to use when updated state of its own entities, etc.). In embodiments, the new node may identify any number of successor nodes and/or predecessor nodes along any of the updated axis keyspaces (x-axis, y-axis, z-axis keyspaces).

As described herein, a node (e.g., the original node, "parent" node, "predecessor node) may cause a new node to be allocated (e.g., by sending a request to the node allocator after determining that a portion of a volume is to be assigned to the new node). The new key is assigned to the new node and uniquely identifies the portion of the volume of space that is owned by the new node. The new node may send to the original node a request for authoritative state of the entities located within the portion of the volume of space (e.g., after inserting itself into the axis keyspaces). In response to receiving the request, the original node may send the authoritative state of the entities located within the portion of the volume to the new node. The new node may then assume authority of the entities located within the portion of the volume of space (the original node retains authority of other entities within the remaining portion of the volume of space).

In embodiments, a node may store a copy of authoritative state of the entities located within a volume owned by another neighbor node so that the node may assume authority of those entities if the other node fails or is removed (e.g., due to a drop in the load on the other node). For example, the original node in FIG. 1 may store a copy of the authoritative state of the entities located within volume B. Over time, the original node may receive updates for the authoritative state of the entities located within volume B. The original node may update the copy of the authoritative state of the entities located within volume B based on the received updates.

In some embodiments, the original node may determine that the new node has failed. In response, the original node may assume authority of the entities located within volume B based at least on the updated copy of the authoritative state (e.g., assuming authority of the entities by applying the updated copy of the authoritative state to the entities). In embodiments, the original node may receive, from the new node, a request to transfer authority of the entities located within volume B to the original node (e.g., in response to the new node detecting an amount of load on the new node has fallen below a threshold amount). In response to receiving the request to transfer authority, the original node may 1) obtain from the new node one or more most recent updates for the authoritative state of the entities located within volume B, 2) update the copy of the authoritative state of the entities located within volume B based on the most recent updates to generate a most recent copy of the authoritative state of the entities, and 3) assume authority of the entities located within volume B based at least on the most recent copy of the authoritative state of the entities. Although the above example depicts the original node assuming authority of entities of the new node, in embodiments any node may assume authority of nodes of any other adjacent node in the same or similar manner (e.g., due to failure of a node or removal of a node).

In embodiments, a node may receive updates to proxy state data for any number of entities of any number of its neighbor nodes. The node may update its proxy state data (e.g., stored at the node) based on the received updates. In some embodiments, a neighbor node may determine that one of its entities that was in its volume has moved into the node's volume. In response, the neighbor node may send authoritative state data for the entity to the node. The node may then assume authority of the entity. Thus, in embodiments, the authoritative state data for an entity may include data that is needed for a node to assume authority over the entity, whereas the proxy data for that entity may not include such data. Therefore, a given node may be unable to assume authority of an entity based only on proxy data of the entity.

Figure 2A:
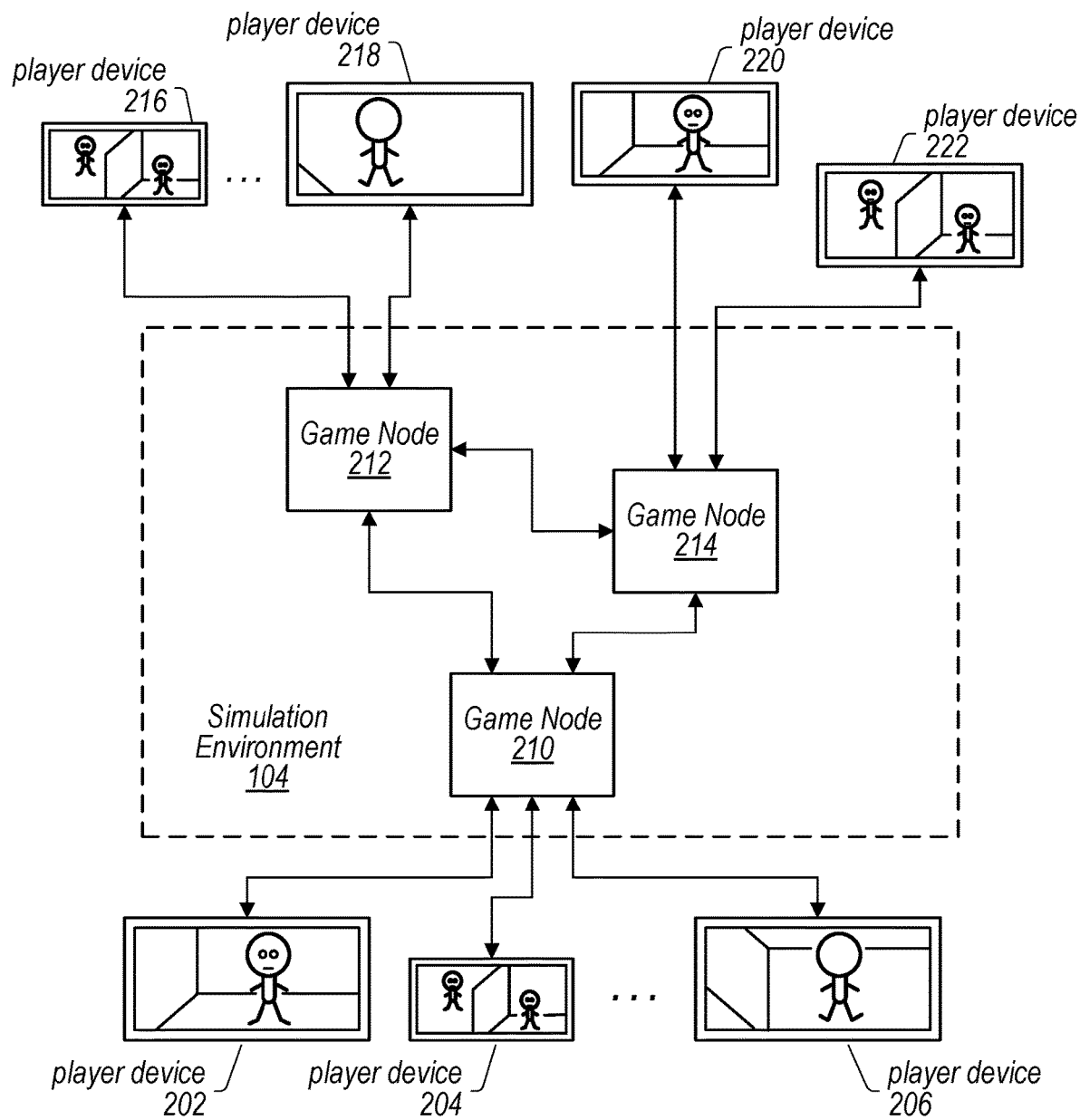
FIG. 2A is a logical block diagram illustrating a system for implementing a simulation environment, according to some embodiments.

FIG. 2A is a logical block diagram illustrating a system for implementing a simulation environment, according to some embodiments.

In the depicted example, the simulation environment 104 implements a simulation as a game session for a multiplayer game. There are multiple player devices 202, 204, 206, 216, 218, 220, 222 participating in a multiplayer gaming session hosted by resources of a simulation environment 104. In embodiments, the player devices may be examples of the client devices 106 of FIG. 1.

The hosting can be performed using a set of game nodes 210, 212, 214 (e.g., servers/server compute instances) each corresponding to software running on at least one processing instance, or other computing resource, offered through the game hosting environment 104. In some embodiments, the processing instances can be any appropriate type of processing resource, such as a physical or virtual server or machine instance as discussed herein. A processing instance can store and execute code for various processes for a gaming session, such as to function as a game server for some or all players for an active game session. The player devices transmit event data, corresponding to input of a player to a respective device, over at least a network (e.g., network 110) that is received and directed to an appropriate game node.

Multiple players can utilize their respective devices to connect to an appropriate game node for the active game session. The player devices can join in a session of the game with state data that is managed by a game state component of the relevant game node. In some embodiments, players can join an existing session in process, and leave during the session, such that the number of players may vary over time. The player devices can include specific gaming devices, such as gaming consoles or handheld consoles, or other computing devices such as smart phones, tablet computers, wearable computers (e.g., smart glasses or watches), desktop or notebook computers, and the like. Event information can be transmitted from the player devices at appropriate times, such as periodically, in response to certain actions or occurrences in the game, in response to requests from the node, or at other appropriate times. The game node(s) can maintain the game state information such that the game state is consistent across the various player devices, as well as to enable a saving or restoring of the game for any or all of the devices.

In many situations, the player devices will be at different geographical locations. In order to ensure that all the game state information utilized by the player devices is accurate, player input in many cases will be transmitted from the individual player devices to the relevant game node, such that the game state can be updated and propagated to the various player devices so the devices are all utilizing consistent game state information. Such an approach can result in difficulty managing state for the game, however, as any instance of player data must be transmitted from the respective player device to the node, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball, a first player might direct the action towards a last known location received for a target player. The action may be to miss, as the other player may have moved since the last received location such that the first player may see the action take place but the action will actually fail because when the game state data is synchronized, the target player will actually not have been in that location. The game node then might have to retract the apparently completed action, or wait to determine whether the action is successful, either of which can significantly degrade the gaming experience.

Accordingly, various embodiments can take advantage of multiple game nodes that work together to manage a single game environment that is able to support a large number of players with minimal impact on gameplay due to latency and other such issues. In FIG. 2 it can be seen that there are multiple game nodes 210, 212, 214 that are each associated with a subset of player devices that are active or participating in an active game session hosted by those game nodes. The game nodes can each execute the gaming application, and can each be responsible for managing game state for their respective subset of player devices (e.g., managing entities within its volume). In embodiments, each player device may communicate with only one of the game nodes, which has authority for the game state for that device (e.g., the state of entities controlled by that device). When an event occurs on one of the player devices (e.g., device 202), such as in response to user input to the device that corresponds to the game session, event data including information for the input (e.g., an input packet) can be transmitted from the player device 202 to the respective game node 210. That game node 310 can then be responsible for transmitting data for the event to the other game nodes 212, 214 so that they have authoritative data corresponding to the event. These nodes can similarly send event data from their respective devices to the first game node 210. In this way, all game nodes have accurate game state data even though each individual game node only has authority over the state for a specific subset of devices (and corresponding entities) for the game.

As mentioned, the transmitted event data can include timing information as well, as may take the form of a time stamp specifying a time at which the input was received. In this way, a game node receiving that information can simulate the event as of the time in which the input was received or the event generated. Since this will have been received for an event that already occurred on the respective client device, this will effectively enable each receiving game node to "rewind" time and cause the event to be simulated for the time at which it occurred on the respective player device. This can help to ensure accurate gameplay even in the presence of latency, as a determination such as a hit or collision can be determined by the client device for the state of the game at the time of the input. A configuration such as that illustrated in FIG. 2 enables multiple game nodes 210, 212, 214 to accurately manage game state while distributing authority for the various player devices. Although three nodes are shown, in various embodiments any number of nodes may be used in the same or similar manner as described above. For example, the number of nodes may increase or decrease to any number, depending on the load of the nodes/simulation.

Figure 2B:
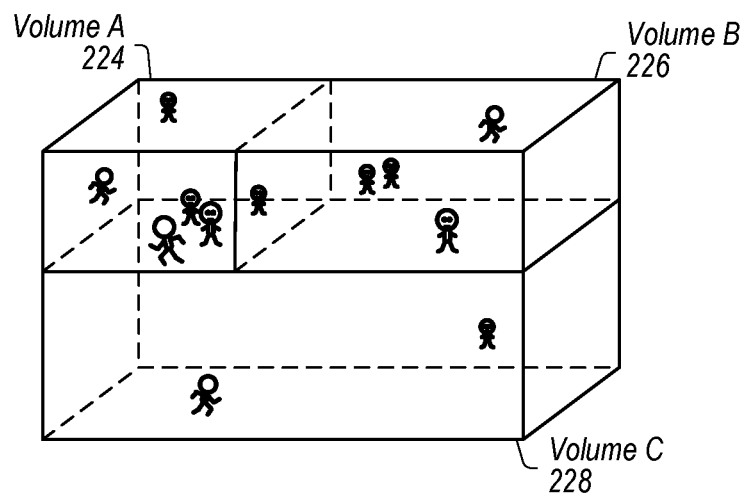
FIG. 2B illustrates an example of volumes owned by different nodes, according to some embodiments.

FIG. 2B is illustrate an example of volumes owned by different nodes, according to some embodiments.

In the depicted example, the game node 210 of FIG. 2A may own volume A 224, the game node 212 of FIG. 2A may own volume B 226, and the game node 214 of FIG. 2A may own volume C 228. In the depicted embodiment, the volumes may have been assigned to the three nodes in order to distribute the load across the three nodes (e.g., to reduce the amount of load per node). For example, volume of all three nodes may have originally been assigned to one node. At a later point in time, the volume may have been split into two volumes due to increased load. At a later point in time, one of those volumes may have been split into two volumes due to increased load, forming the three volumes.

In embodiments, the load may be distributed in an approximately equal amount among the different servers or distributed in a manner to prevent any one server from exceeding a threshold amount of load. For example, each of the nodes has authority over six or less entities. In such an embodiment, the threshold load may be set to six entities. If a given node is assigned more than six entities, then it may split its volume between itself and a new node, as described herein.

Figure 3:
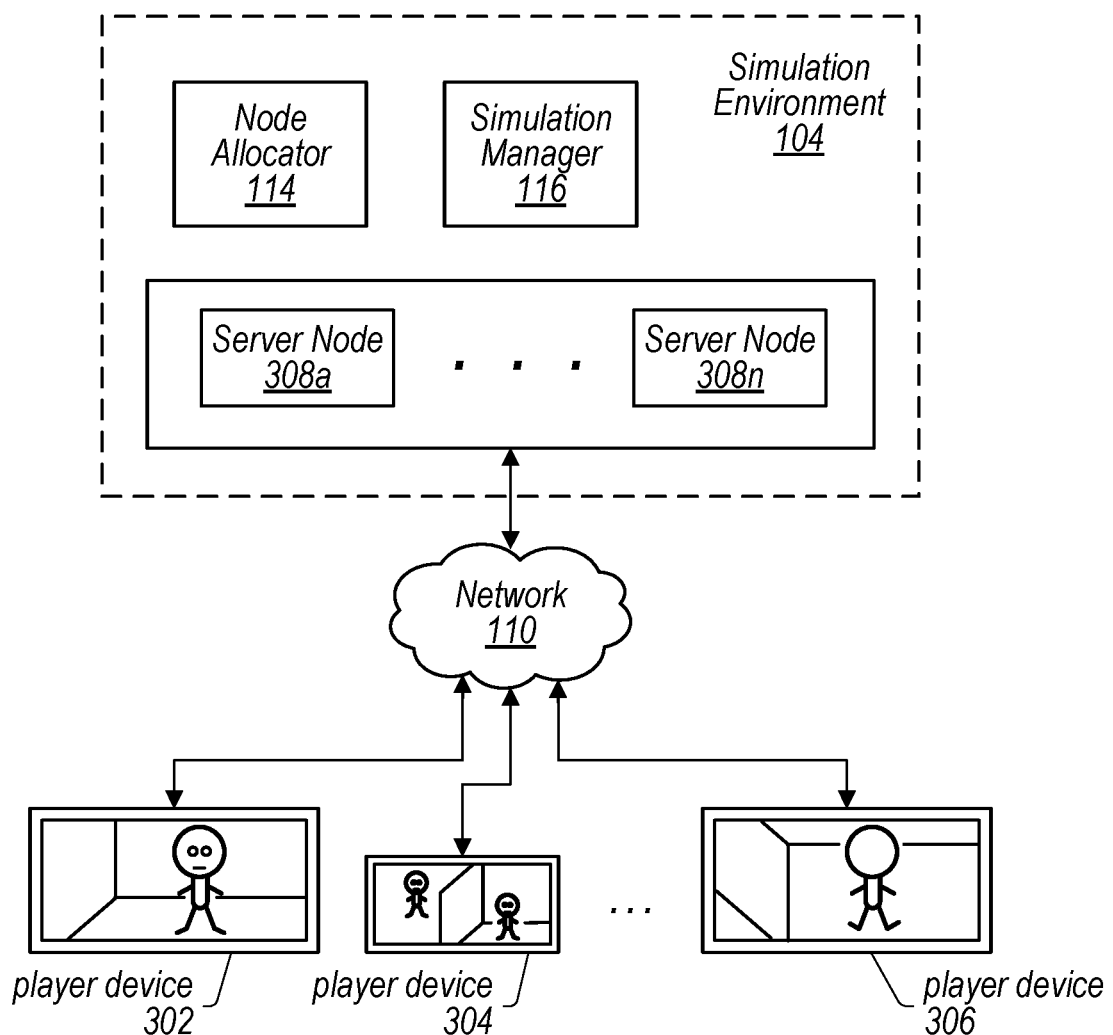
FIG. 3 is a logical block diagram illustrating a system for managing game state for multiple client devices, according to some embodiments.

FIG. 3 is a logical block diagram illustrating a system for managing game state for multiple client devices, according to some embodiments.

As shown, the simulation environment may include any number of server nodes 308 (e.g., compute instances) that implement a simulation. In embodiments, each server node manages a different volume of space of the simulation. As described herein, the number of server nodes 308 may increase or decrease, depending on how much load is placed on the server nodes 308.

Player devices 302, 303, 306 can submit event data across at least one network 110 that is received and processed by one or more of the server nodes 308. For example, device 302 may communicate with server node 308a because that node has authority over the entity controlled by the user/player using device 302. Device 304 and 306 may both may communicate with server node 308n because that node has authority over the entity controlled by the user/player using device 304 as well as the entity controlled by the user/player using device 306. In various embodiments, each server node may have authority over any number of entities (including zero), depending on the location of the entities within the world space of the simulation (e.g., x, y, z coordinates of the entity's position). In some embodiments, the simulation environment receives event data at an interface layer of the simulation environment, which can direct the event data to the responsible game node for that player device with respect to the active game session. That game node can then be responsible for managing the corresponding input with respect to the active game session, which can include processing the input and propagating result data to the other game nodes.

In embodiments, each game node 308 receiving result data from another game node can apply that result data to the local players (e.g., entities) over which that node has authority with respect to the game or environment. A first node receiving the input data can perform a simulation of an event, corresponding to that input, for a relevant time in the past with respect to the active session, which enables the node to effectively rewind and cause the event to be processed as of the time at which the corresponding input was received at the client device. For example, the event data can include the throwing of a ball at a particular time from a particular location in the game world in a particular direction and with a particular velocity. The game node performing the simulation can simulate that action occurring at that time in the past with respect to the state of the game, as indicated by the timestamp in the event data received from the client device, and can determine any impact on the state of the game for at least one other player, such as whether the ball hit a player avatar as a result of the throw. If so, the information about the contact, if that node has authority over that game state or avatar, etc., can be propagated to the other game nodes such that the game nodes will all have consistent game state information (e.g., a proxy data) that is based on information from the respective authority in the game world.

As shown, the simulation environment also includes a node allocator 114 and a simulation manager 116. The node allocator 114 and the simulation manager 116 may perform any type of functionality in order to implement the simulation, including the functionality as described for FIG. 1. In embodiments, after the one or more nodes 308 are instantiated, they may perform any type of functionality required to implement the simulation, including adding/removing any number of nodes (e.g., based on the load) and adding/removing any number of entities that correspond to any number of clients.

Figure 4A:
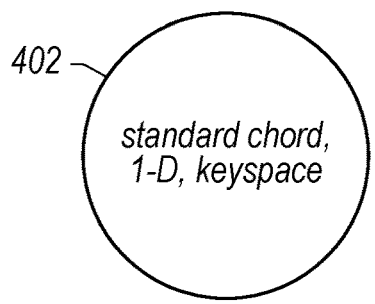
FIGS. 4A-4C illustrate keyspaces for different dimensions, according to some embodiments.
Figure 4B:
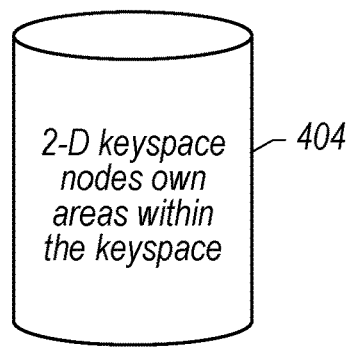
Figure 4C:
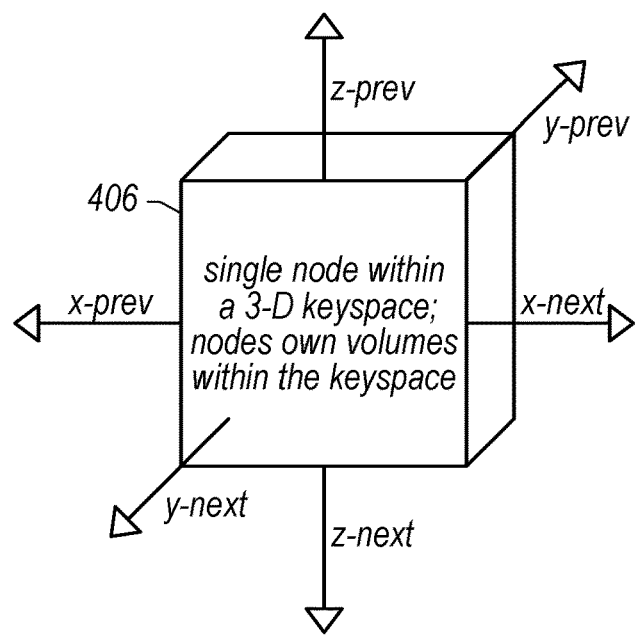

FIGS. 4A-4C illustrate keyspaces for different dimensions, according to some embodiments.

FIG. 4A illustrates a visualization of a chord one-dimensional keyspace in which a chord DHT algorithm (or other consistent hashing algorithm) may be used. In this example, keys are grouped and maintained according to a consistent hash in one dimension. FIG. 4B illustrates a visualization of a two-dimensional keyspace in which the chord DHT algorithm (or other consistent hashing algorithm) may be used across a keyspace for one dimension and across another keyspace for the other dimension. In this example embodiment, different nodes may own different areas within the keyspace (e.g., based on the x and y coordinates assigned to each node).

FIG. 4C illustrates a visualization of a node within a 3D keyspace in which the chord DHT algorithm (or other consistent hashing algorithm) may be used. In this example embodiment, different nodes may own different volumes within the keyspace (e.g., based on the x, y, z coordinates assigned to each node as described for FIG. 1).

In embodiments, this "multichord" variant of the chord algorithm extends chord to operate on a multidimensional space (3D). Keys may be Cartesian coordinates in order to preserve locality and have spatially close entities be able to live and interact on the same node (e.g., the same server shard) or on adjacent nodes (e.g., adjacent server shards). A decentralized, distributed 3D spatial hash may be maintained across multiple nodes as described herein. The spatial hash may be capable of not only querying by key as in a typical distributed hash, but also naturally maintains concepts of proximity required for 3D simulation purposes.

Figure 5A:
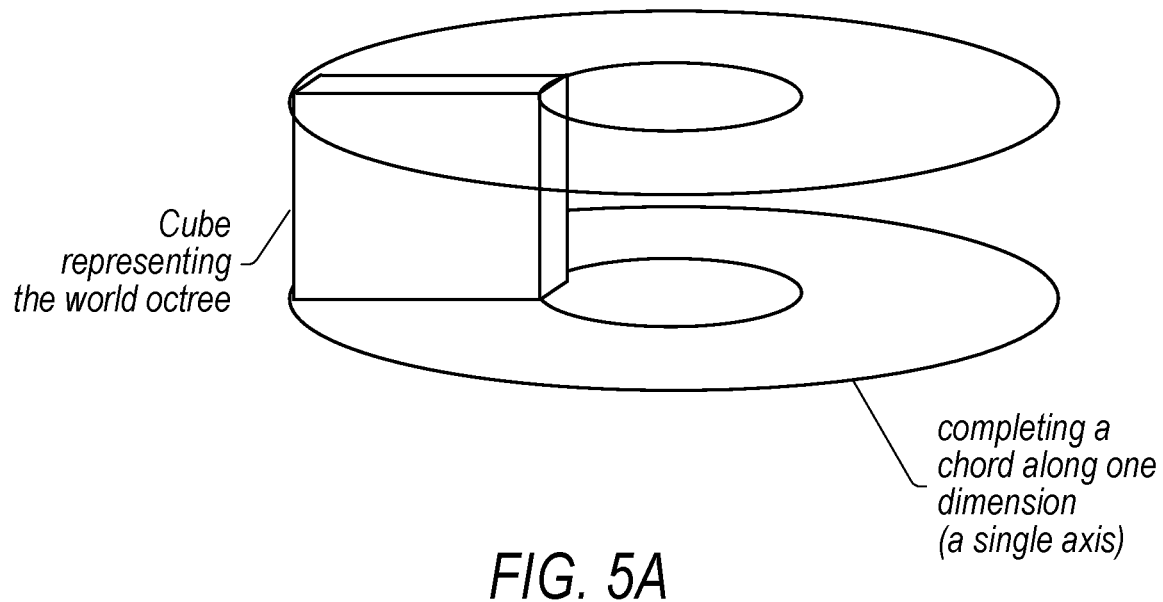
FIGS. 5A-5B illustrate visualizations of a 3D keyspace, according to some embodiments.
Figure 5B:
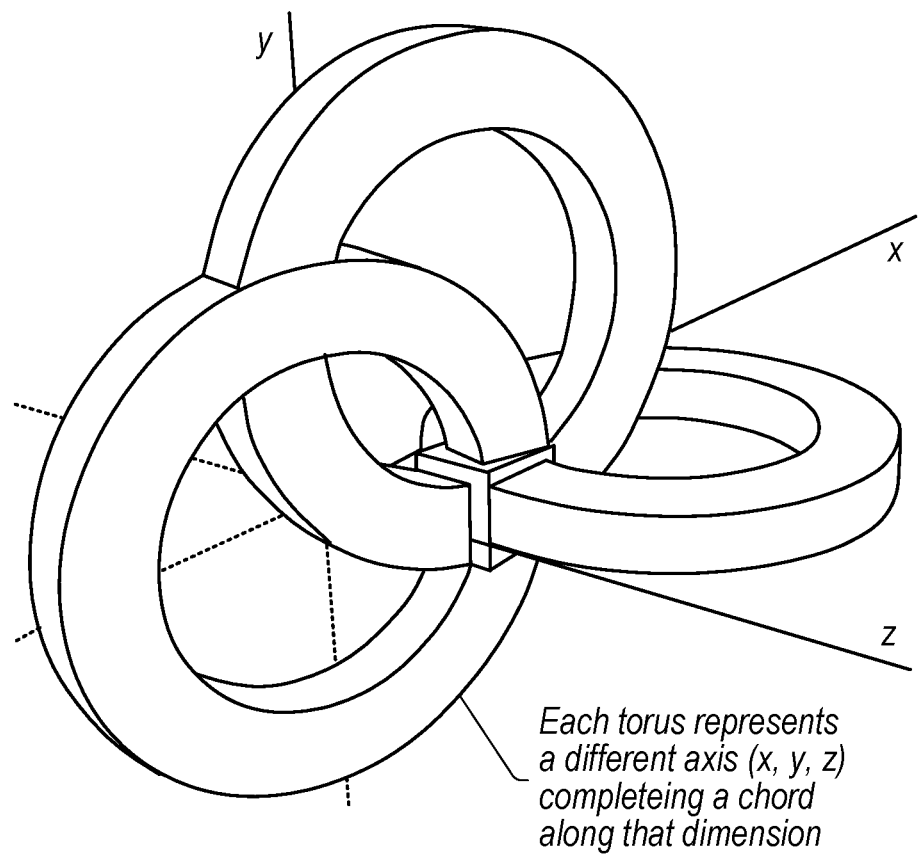

FIGS. 5A-5B illustrate visualizations of a 3D keyspace, according to some embodiments.

In the depicted embodiment, all six faces of world space connect to each other. Front circularly joins to back, left to right, and top to bottom. In FIGS. 5A and 5B, the cube represents the world octree, with the torus connecting front to back representing a single axis completing the chord along that dimension. All three axes may require identical junctions. This may be required to maintain the chord structure (e.g., circular keyspace) and to provide the same guarantees of consistency, integrity, and fault tolerance as nodes join and leave, but the proxied entities may not have the same wrapping semantics in-game, and so they would not be replicated to clients (e.g., replication windows may not include these entities).

When inserting a new node, the new node may be assigned a top-back-left coordinate of the cube or rectangular volume as the root coordinate of the new node (or some other Cartesian identifier/location may be used as the root coordinate). The node joins the multichord and takes over authoritative control over entities it deems to be within its domain. Predecessors and successors for a node can clone authoritative state using entity replicators at each node. If a node leaves either gracefully or non-gracefully, this allows one of the adjacent nodes to assume authoritative control with minimal or no loss of data.

Figure 6A:
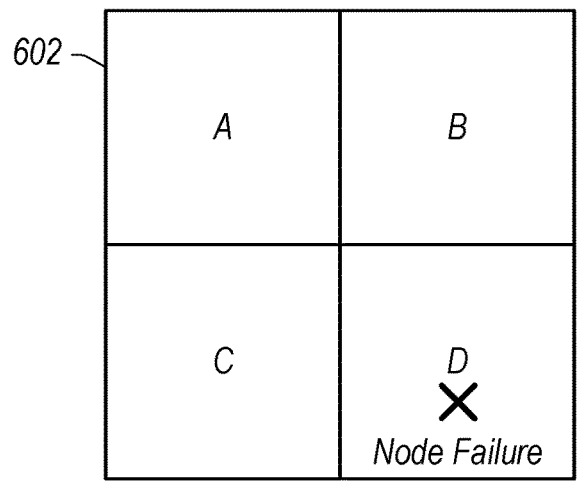
FIGS. 6A-6C illustrate examples of a node claiming volume after another node failure, according to some embodiments.
Figure 6B:
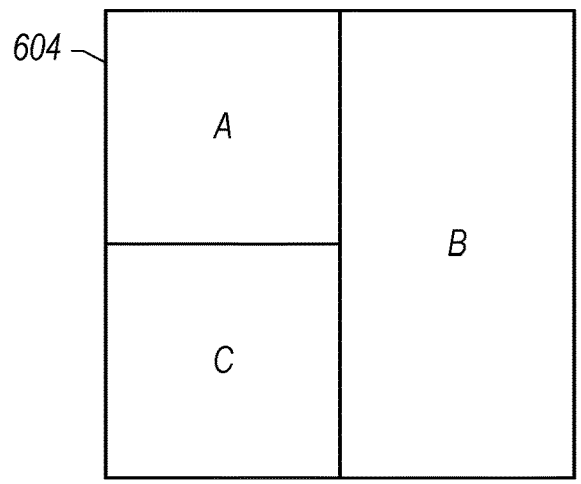
Figure 6C:
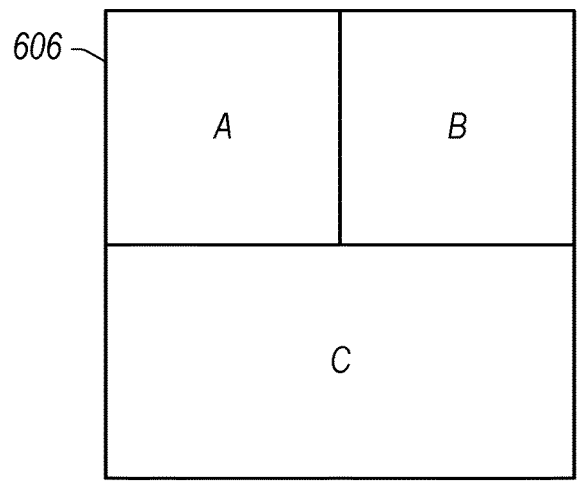

FIGS. 6A-6C illustrate examples of a node claiming volume after another node failure, according to some embodiments.

The example embodiment shows a top-down quad-tree case in 2D, although the concepts of FIGS. 6 and 7 apply to 3D volumes as well (e.g., the depicted example may be a cross-section view of four cubic/rectangular volumes that are each managed by a different node). In embodiments, a dimensional bias may be applied to tie break how space is reclaimed upon node leave. As shown in FIG. 6A, node D has left due to node failure. Node A, B, or C will assume control of the domain/volume. The inherent bias of the simulation/nodes may consistently apply a top-down approach (e.g., along a particular axis, shown in FIG. 6B) or a left-right approach (e.g., along a different axis, shown in FIG. 6C).

Figure 7A:
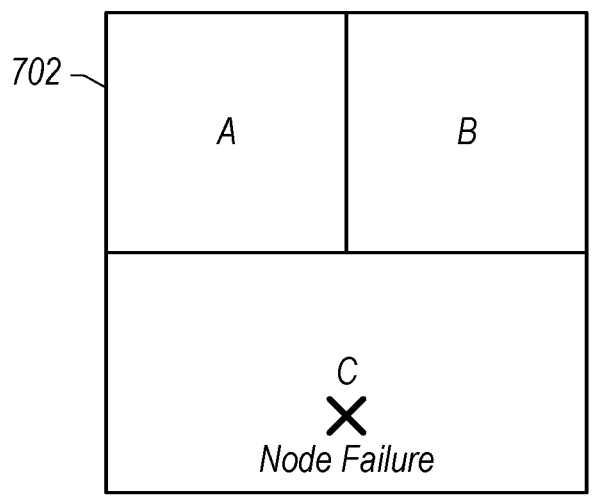
FIGS. 7A-7B illustrate examples of multiple nodes claiming volume after another node failure, according to some embodiments.
Figure 7B:
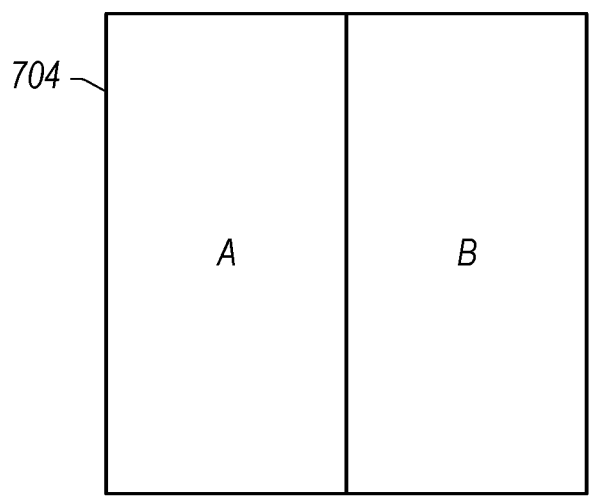

FIGS. 7A-7B illustrate examples of multiple nodes claiming volume after another node failure, according to some embodiments.

In FIG. 7A, node C fails. As shown in FIG. 7B, nodes A and B may both recognize that their successor has dropped. As shown, inherent bias of the nodes/simulation may cause both nodes to project forward their domain along a particular axis up until the next node in the multichord. In embodiments, predecessor nodes may keep a full authoritative replication window open to the successor node, so all authoritative state is copied and can be restored in the event of a node drop. In some embodiments, a given entity may belong to the node with a root key that has the closest x, y, z coordinate that is less than the entity's position. Any other suitable techniques may be used to determine which node an entity belongs to (e.g., based on position of the entity relative to the root coordinate). For example, in some embodiments, a given entity may belong to the node with a root key that has the closest x, y, z coordinate that is greater than the entity's position.

Figure 8:
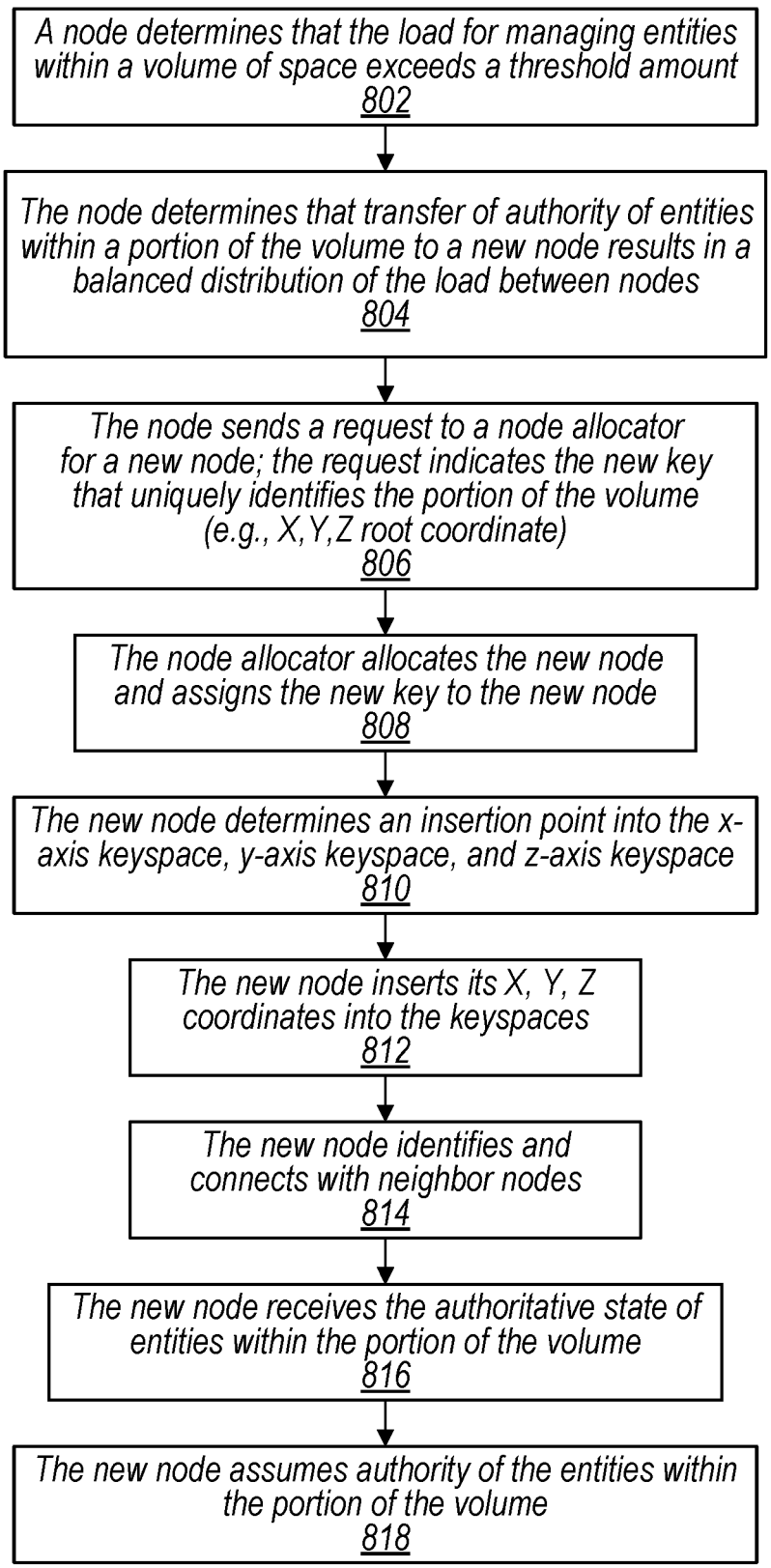
FIG. 8 is a high-level flowchart illustrating various methods and techniques to implement a scalable 3D simulation using a distributed 3D keyspace, according to some embodiments.

FIG. 8 is a high-level flowchart illustrating various methods and techniques to implement a scalable 3D simulation using a distributed 3D keyspace, according to some embodiments. In various embodiments, any of the functionality described for any portions of the flowcharts 8-9 may be performed by any of the components of FIGS. 1-7 and/or 10.

These techniques, as well as the techniques discussed with regard to FIG. 9, may be implemented using components or systems as described above with regard to FIGS. 1-7, as well as other types of components or systems, and thus the following discussion is not intended to be limiting as to the other types of systems that may implement the described techniques. For example, the techniques may be implemented by a simulation environment of a provider network and/or a client device.

At block 802, a node determines that the load for managing entities within its assigned volume exceeds a threshold amount (or is predicted to exceed the threshold amount based on performance metrics of the node). In response to the determination that the load exceeds the threshold amount, at block 804, the node determines that a transfer of authority of entities within a portion of the volume to a new node will result in a balanced distribution of the load between the nodes. In some embodiments, in response to the determination that the load exceeds the threshold amount, the node determines the portion of the volume by dividing the volume in half (e.g., along an axis) and assigning one of the halves as the portion to be managed by the new node.

At block 806, the node sends a request to a node allocator for a new node. The request includes the new key that uniquely identifies the portion of the volume (e.g., x, y, z root coordinate). At block 808, the node allocated allocates the new node and assigns the new key to the new node. At block 810, the new node determines an insertion point into the x-axis keyspace, the y-axis keyspace, and the z-axis keyspace. At block 812, the new node inserts its x, y, and z coordinates into the keyspaces. At block 814, the new node identifies and connects with neighbor nodes. At block 816, the new node receives the authoritative state of entities within the portion of the volume. At block 818, the new node assumes authority of the entities within the portion of the volume.

Figure 9A:
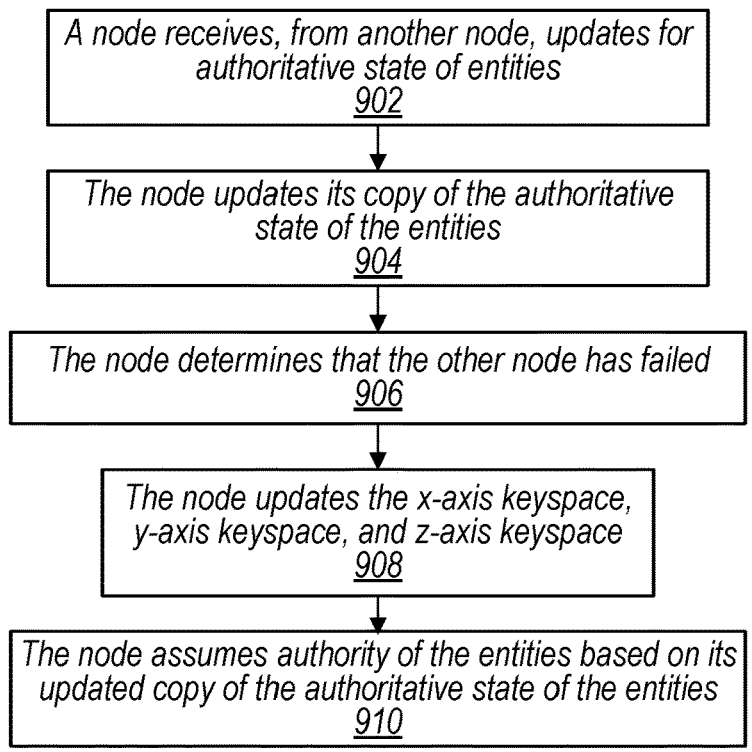
FIGS. 9A-9B are high-level flowcharts illustrating various methods and techniques to implement a scalable 3D simulation using a distributed 3D keyspace, according to some embodiments.
Figure 9B:
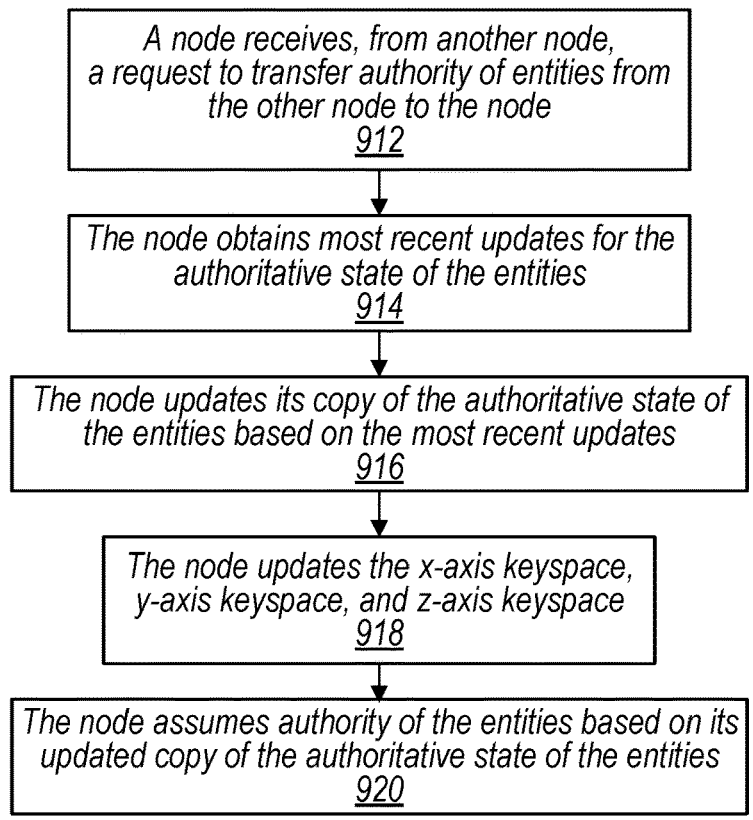

FIGS. 9A-9B are high-level flowcharts illustrating various methods and techniques to implement a scalable 3D simulation using a distributed 3D keyspace, according to some embodiments.

FIG. 9A illustrates a method to handle a failed node. At block 902, a node receives from another node, updates for authoritative state of entities. At block 904, the node updates its copy of the authoritative state of the entities. At block 906, the node determines that the other node has failed. At block 908, the node updates the x-axis keyspace, y-axis keyspace, and z-axis keyspace (e.g., removes the coordinates of the other node). At block 910, the node assumes authority of the entities based on its updated copy of the authoritative state of the entities (e.g., it determines the entities within its assigned volume based on the updated keyspaces and in response, assumes authority of those entities).

FIG. 9B illustrates a method to handle removal of a node. At block 912, a node receives, from another node, a request to transfer authority of entities from the other node to the node. At block 914, the node obtains from the other node the most recent updates for the authoritative state of the entities. At block 916, the node updates its copy of the authoritative state of the entities based on the most recent updates. At block 918, the node updates the x-axis keyspace, y-axis keyspace, and z-axis keyspace (e.g., removes the coordinates of the other node). At block 920, the node assumes authority of the entities based on its updated copy of the authoritative state of the entities (e.g., it determines the entities within its assigned volume based on the updated keyspaces and in response, assumes authority of those entities).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of simulation environment and any other components that implement the techniques described herein). The various methods as illustrated in the figures and described herein represent example embodiments of methods. The order of any method may be changed, and various elements may be added, reordered, combined, omitted, modified, etc.

Figure 10:
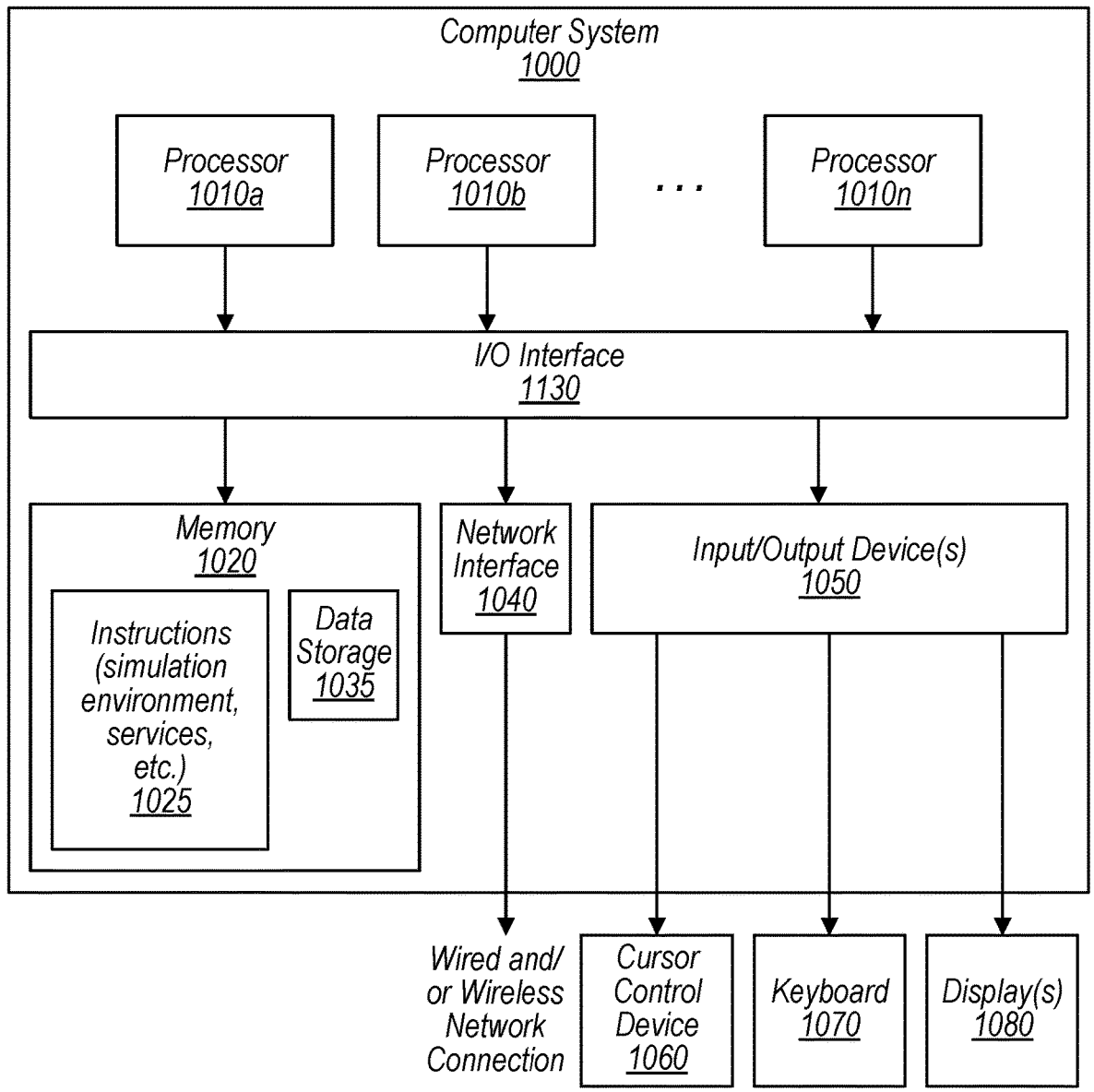
FIG. 10 is a block diagram illustrating an example computing system, according to some embodiments.

Embodiments to implement a scalable 3D simulation using a distributed 3D keyspace, which may interact with various other systems or devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., simulation environment and any other components, etc.) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments (e.g., models, functions, telemetry data, etc.). In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing, by one or more computing devices that implement a plurality of nodes for a simulation, wherein individual nodes of the plurality of nodes are assigned a key that uniquely identifies a volume of space of the simulation managed by the individual nodes:
determine, by a particular node of the plurality of nodes, that a portion of the volume of space is to be assigned to a new node, wherein authority of entities located within the portion of the volume of space is to be transferred from the particular node to the new node;
causing, by the particular node, the new node to be allocated, wherein a new key is assigned to the new node that uniquely identifies the portion of the volume of space;
sending, from the new node to the particular node, a request for authoritative state of the entities located within the portion of the volume of space;
in response to the request, sending, from the particular node to the new node, the authoritative state of the entities located within the portion of the volume of space; and
assuming, by the new node, authority of the entities located within the portion of the volume of space, wherein the particular node retains authority of other entities within a remaining portion of the volume of space.

2. The method as recited in claim 1, wherein the key comprises a root 3D coordinate that indicates a location of the volume of space in the simulation, and further comprising:
determining, by the particular node, another root 3D coordinate that indicates a location of the portion of the volume of space in the simulation, wherein the new key assigned to the new node comprises the other root 3D coordinate.

3. The method as recited in claim 2, wherein the plurality of nodes maintains a circular x-axis keyspace that comprises x-axis coordinates of a plurality of keys according to a consistent hashing algorithm, a circular y-axis keyspace that comprises y-axis coordinates of the plurality of keys according to a consistent hashing algorithm, and a circular z-axis keyspace that comprises z-axis coordinates of the plurality of keys according to a consistent hashing algorithm, and further comprising:
  determining, based on communication with one or more of the plurality of nodes, an insertion point for an x-axis coordinate of the new key into the x-axis keyspace, an insertion point for a y-axis coordinate of the new key into the y-axis keyspace, and an insertion point for a z-axis coordinate of the new key into the z-axis keyspace; and
  causing insertion of the x-axis coordinate, the y-axis coordinate, and the z-axis coordinate of the new key into the respective insertion points for the x-axis keyspace, the y-axis keyspace, and the z-axis keyspace, wherein an updated x-axis keyspace, an updated y-axis keyspace, and an updated z-axis keyspace is generated based on the insertion points.

4. The method as recited in claim 3, further comprising identifying, by the new node, one or more of:
  a plurality of successor nodes on the updated x-axis keyspace,
  a plurality of predecessor nodes on the updated x-axis keyspace,
  a plurality of successor nodes on the updated y-axis keyspace,
  a plurality of predecessor nodes on the updated y-axis keyspace,
  a plurality of successor nodes on the updated z-axis keyspace, or
  a plurality of predecessor nodes on the updated z-axis keyspace.

5. The method as recited in claim 1, further comprising:
  storing, by the particular node, a copy of the authoritative state of the entities located within the portion of the volume of space;
  receiving, by the particular node from the new node, one or more updates for the authoritative state of the entities located within the portion of the volume of space; and
  updating, by the particular node, the copy of the authoritative state of the entities located within the portion of the volume of space based on the received updates.

6. The method as recited in claim 5, further comprising:
  determining, by the particular node, that the new node has failed; and
  in response to determining that the new node has failed, assuming, by the particular node, authority of the entities located within the portion of the volume of space based at least on the updated copy of the authoritative state.

7. The method as recited in claim 5, further comprising:
  receiving, by the particular node from the new node, a request to transfer authority of the entities located within the portion of the volume of space to the particular node; and
  in response to receiving the request to transfer authority:
    obtaining, by the particular node from the new node, one or more most recent updates for the authoritative state of the entities located within the portion of the volume of space;
    updating, by the particular node, the copy of the authoritative state of the entities located within the portion of the volume of space based on the most recent updates to generate a most recent copy of the authoritative state of the entities; and
    assuming, by the particular node, authority of the entities located within the portion of the volume of space based at least on the most recent copy of the authoritative state of the entities.

8. The method as recited in claim 1, further comprising:
  receiving, by the new node, updates to proxy state data for a plurality of entities of a plurality of volumes adjacent to the new node that are managed by a plurality of other nodes, wherein the plurality of other nodes have authority of different entities of the plurality of entities; and
  updating, by the new node, the proxy state data stored at the new node based on the received updates to the proxy state data.

9. The method as recited in claim 8, further comprising:
  determining, by one of the other nodes, that a particular one of the plurality of entities has moved into the portion of the volume of space managed by the new node; and
  in response to the determination that the particular entity has moved into the portion of the volume of space managed by the new node, sending authoritative state data for the particular entity from the other node to the new node, wherein the new node assumes authority of the particular entity.

10. A system, comprising:
  one or more processors; and
  one or more memories, wherein the one or more memories have stored thereon instructions, which when executed by the one or more processors, cause the one or more processors to implement a node allocator and a plurality of nodes for a simulation at a provider network for a plurality of clients, wherein for particular nodes of the plurality of nodes, the particular node is assigned a key that uniquely identifies a volume of space of the simulation with respect to other volumes of space of the simulation, wherein the particular node has authority of entities located within the volume of space, and wherein the particular node is configured to:
    determine, based on one or more criteria, that a portion of the volume of space is to be assigned to a new node, wherein authority of entities located within the portion of the volume of space is to be transferred from the particular node to the new node; and
    send a request to the node allocator for the new node, wherein the request indicates a new key that uniquely identifies the portion of the volume of space with respect to other volumes of space of the simulation; and wherein
  the node allocator is configured to:
    receive the request for the new node; and
    allocate the new node, wherein the new node is assigned the new key that uniquely identifies the portion of the volume of space; and wherein
  the new node is configured to:
    receive, from the particular node, authoritative state of the entities located within the portion of the volume of space; and
    assume authority of the entities located within the portion of the volume of space, wherein the particular node retains authority of other entities within a remaining portion of the volume of space.

11. The system as recited in claim 10, wherein the key comprises a root 3D coordinate that indicates a location of the volume of space in the simulation, wherein the particular node has authority of the entities located within the volume of space based on the root 3D coordinate of the key and other 3D coordinates of positions of the entities in the volume of space, and wherein the particular node is further configured to:

determine another root 3D coordinate that indicates a location of the portion of the volume of space in the simulation; and assign the other root 3D coordinate as the new key to be assigned to the new node.

12. The system as recited in claim 11, wherein the plurality of nodes maintains a circular x-axis keyspace that comprises x-axis coordinates of a plurality of keys according to a consistent hashing algorithm, a circular y-axis keyspace that comprises y-axis coordinates of the plurality of keys according to a consistent hashing algorithm, and a circular z-axis keyspace that comprises z-axis coordinates of the plurality of keys according to a consistent hashing algorithm, and wherein the new node is configured to:

determine, based on communication with one or more of the plurality of nodes, an insertion point for an x-axis coordinate of the new key into the x-axis keyspace, an insertion point for a y-axis coordinate of the new key into the y-axis keyspace, and an insertion point for a z-axis coordinate of the new key into the z-axis keyspace;

cause insertion of the x-axis coordinate, the y-axis coordinate, and the z-axis coordinate of the new key into the respective insertion points for the x-axis keyspace, the y-axis keyspace, and the z-axis keyspace, wherein an updated x-axis keyspace, an updated y-axis keyspace, and an updated z-axis keyspace is generated based on the insertion points;

identify a plurality of neighbor nodes of the new node based on the updated x-axis keyspace, the updated y-axis keyspace, and the updated z-axis keyspace; and connect with the plurality of neighbor nodes.

13. The system as recited in claim 12, wherein to identify the plurality of neighbor nodes of the new node, the new node is configured to identify one or more of:

a plurality of successor nodes on the updated x-axis keyspace, a plurality of predecessor nodes on the updated x-axis keyspace, a plurality of successor nodes on the updated y-axis keyspace, a plurality of predecessor nodes on the updated y-axis keyspace, a plurality of successor nodes on the updated z-axis keyspace, or a plurality of predecessor nodes on the updated z-axis keyspace.

14. The system as recited in claim 10, wherein to determine, based on one or more criteria, that the portion of the volume of space is to be assigned to the new node, the particular node is configured to:

determine that a load for managing the entities located within the volume of space exceeds a threshold value or is predicted to exceed the threshold value; and in response to the determination that the load exceeds the threshold value or is predicted to exceed the threshold value, determine that a transfer of the authority of the entities located within the portion of the volume of space to the new node will result in an approximately balanced distribution of the load between the particular node and the new node.

15. One or more non-transitory computer-accessible storage media storing program instructions that when executed on or across one or more processors of a particular node of a plurality of nodes of a provider network that implement a simulation, wherein the particular node is assigned a key that uniquely identifies a volume of space of the simulation managed by the particular node, cause the one or more processors to:

determine that a portion of the volume of space is to be assigned to a new node, wherein authority of entities located within the portion of the volume of space is to be transferred from the particular node to the new node;

cause, by the particular node, the new node to be allocated, wherein a new key is assigned to the new node that uniquely identifies the portion of the volume of space;

send, from the particular node to the new node, authoritative state of the entities located within the portion of the volume of space; and release authority of the entities located within the portion of the volume of space, wherein the particular node retains authority of other entities within a remaining portion of the volume of space.

16. The one or more non-transitory computer-accessible storage media as recited in claim 15, wherein the key comprises a root 3D coordinate that indicates a location of the volume of space in the simulation, and wherein the instructions when executed on or across the one or more processors cause the one or more processors to:

determine another root 3D coordinate that indicates a location of the portion of the volume of space in the simulation, wherein the new key assigned to the new node comprises the other root 3D coordinate.

17. The one or more non-transitory computer-accessible storage media as recited in claim 16, wherein the plurality of nodes maintains a circular x-axis keyspace that comprises x-axis coordinates of a plurality of keys according to a consistent hashing algorithm, a circular y-axis keyspace that comprises y-axis coordinates of the plurality of keys according to a consistent hashing algorithm, and a circular z-axis keyspace that comprises z-axis coordinates of the plurality of keys according to a consistent hashing algorithm, and wherein the instructions when executed on or across the one or more processors cause the one or more processors to:

update keyspace data to indicate the new node is a successor node of the particular node.

18. The one or more non-transitory computer-accessible storage media as recited in claim 15, wherein the instructions when executed on or across the one or more processors cause the one or more processors to:

store, by the particular node, a copy of the authoritative state of the entities located within the portion of the volume of space;

receive, by the particular node from the new node, one or more updates for the authoritative state of the entities located within the portion of the volume of space; and update, by the particular node, the copy of the authoritative state of the entities located within the portion of the volume of space based on the received updates.

19. The one or more non-transitory computer-accessible storage media as recited in claim 18, wherein the instructions when executed on or across the one or more processors cause the one or more processors to:

determine, by the particular node, that the new node has failed; and in response to the determination that the new node has failed, assume, by the particular node, authority of the entities located within the portion of the volume of space based at least on the updated copy of the authoritative state.

20. The one or more non-transitory computer-accessible storage media as recited in claim 18, wherein the instructions when executed on or across the one or more processors cause the one or more processors to:
- receive, by the particular node from the new node, a request to transfer authority of the entities located within the portion of the volume of space to the particular node; and
- in response to the reception of the request to transfer authority:
  - obtain, by the particular node from the new node, one or more most recent updates for the authoritative state of the entities located within the portion of the volume of space;
  - update, by the particular node, the copy of the authoritative state of the entities located within the portion of the volume of space based on the most recent updates to generate a most recent copy of the authoritative state of the entities; and
  - assume, by the particular node, authority of the entities located within the portion of the volume of space based at least on the most recent copy of the authoritative state of the entities.

\* \* \* \* \*